United States Patent [19]

Cox

[11] Patent Number: 4,548,067
[45] Date of Patent: Oct. 22, 1985

[54] METHOD AND APPARATUS FOR TESTING A RELIEF VALVE

[75] Inventor: J. David Cox, Kilgore, Tex.

[73] Assignee: Hydro-Seal Valve Company, Inc., Kilgore, Tex.

[21] Appl. No.: 598,369

[22] Filed: Apr. 9, 1984

[51] Int. Cl.4 ............................................. F16K 17/00
[52] U.S. Cl. ...................................................... 73/4 R
[58] Field of Search ..................................... 73/4 R, 37

[56] References Cited

U.S. PATENT DOCUMENTS

| | | | |
|---|---|---|---|
| 2,178,901 | 11/1939 | Webster | 73/37 X |
| 2,952,151 | 9/1960 | Simonson et al. | 73/4 R |
| 3,269,170 | 8/1966 | Sebring et al. | 73/4 R |
| 3,768,299 | 10/1973 | Garren | 73/4 R |
| 3,872,875 | 3/1975 | Raidl, Jr. | 73/4 R X |
| 4,428,223 | 1/1984 | Trevisan | 73/4 R |
| 4,480,653 | 11/1984 | Vanderburg | 73/4 R X |

Primary Examiner—Stewart J. Levy
Assistant Examiner—Joseph W. Roskos
Attorney, Agent, or Firm—Pravel, Gambrell, Hewitt & Kimball

[57] ABSTRACT

A method of isolating a relief valve from system pressure in order to test the relief valve while still allowing the relief valve to be exposed to emergency level system pressure. The apparatus includes an isolation valve to be mounted between the vessel or pipeline of the system and the relief valve including a valve element for isolating the system from test fluid while allowing system fluid at emergency pressure to be transmitted to the relief valve even during testing of the relief valve.

4 Claims, 3 Drawing Figures

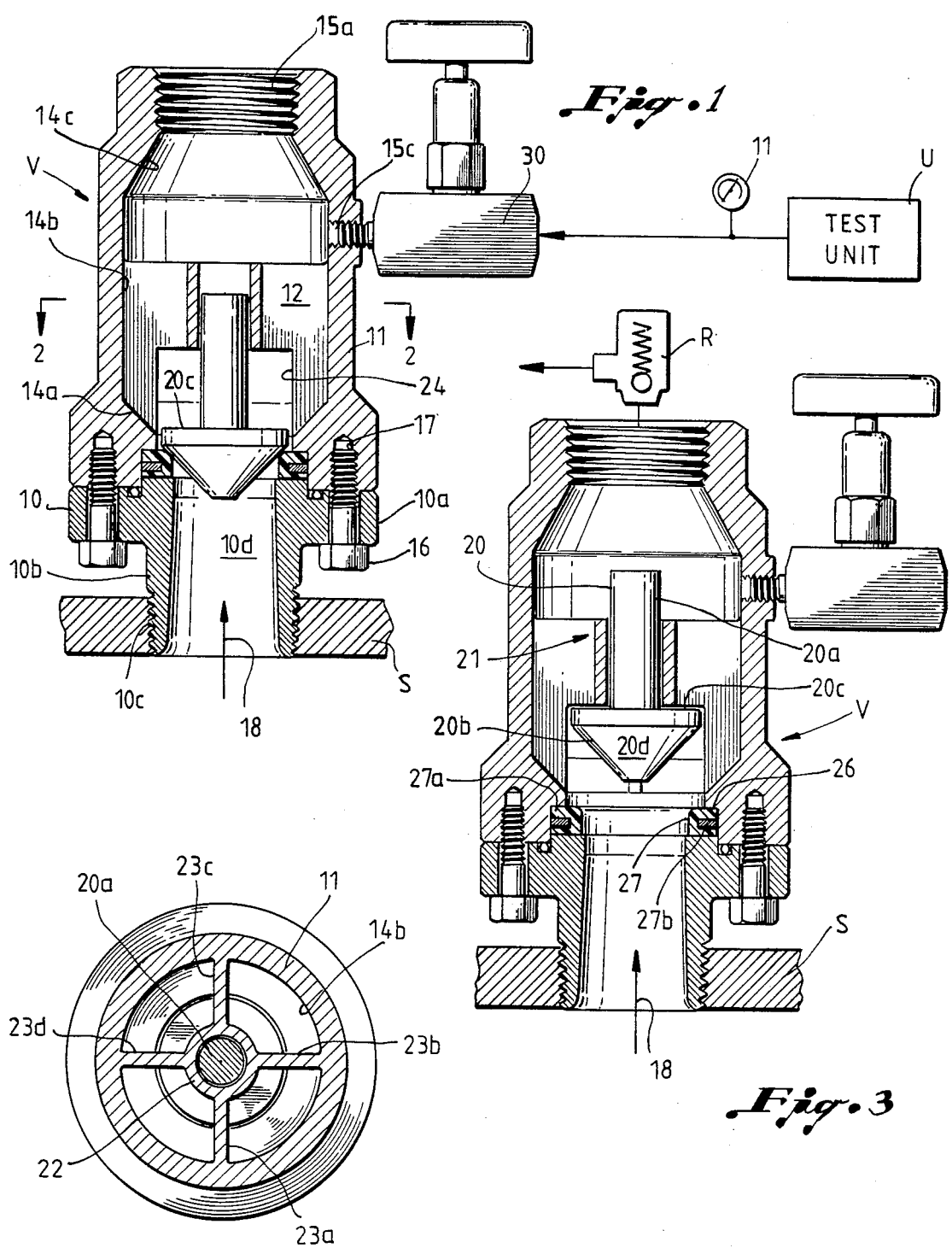

METHOD AND APPARATUS FOR TESTING A RELIEF VALVE

TECHNICAL FIELD OF THE INVENTION

This invention relates to relief valves and specifically, the testing of relief valves.

BACKGROUND OF THE INVENTION

The utilization of a relief or safety valve for venting excess pressure from a vessel or pipeline is well-known in the art. Typically, such a relief valve is spring or otherwise biased to a closed position and moves to an open position in response to such vessel or pipeline having an internal pressure greater than the predesignated release pressure of the relief valve. Relief valves installed in plants and the like need to be periodically checked to be certain that the valves are still properly operating. The valves can become corroded or, due to age or prior use, become totally or partially defective, which may prevent their operation when needed. One method for periodically testing a relief valve is to simply remove the relief valve from the pipeline or vessel and subject the relief valve to the pre-designed test pressure to determine whether or not the relief valve is properly functioning. One of the disadvantages of this type of test procedure is that it may be necessary to shut down operation of the vessel or pipeline in order to test the valve since it is actually removed for testing. A known way to avoid the removal of the relief valve for testing is to permanently mount an intermediate block valve between the relief valve and the pipeline or vessel. When it is necessary to test the relief valve, the block valve is closed and the relief valve is tested by the application of pressure through the closed block valve to the relief valve. This procedure has the disadvantage of preventing the operation of the relief valve during the test. If an emergency arises during the test period while the block valve is closed, the ability to release dangerous pressure levels from the pipeline or vessel is unavailable just when it is most needed. Another disadvantage of the use of block valves is the possibility of inadvertent closing of the block valve by an operator while performing operator duties.

SUMMARY OF THE INVENTION

It is an object of this invention to provide a method and apparatus for the testing of a relief valve while allowing the relief valve to stay in service.

The method of testing a relief valve in accordance with this invention comprises the steps of permanently mounting a system isolator onto a vessel or pipeline between the vessel or pipeline and a pressure relief valve such that under operational conditions, emergency pressure levels within the pipeline or vessel are ventable through the system isolator and pressure relief valve; connecting a pressure test unit in fluid communication with the system isolator and directing a test fluid into the system isolator to cause the system isolator to seal off exposure of the vessel or pipeline to said test fluid; increasing the pressure of the test fluid to sufficient level to test the operation of the relief valve while providing that a system pressure rise to an emergency level is transmittable through the isolator to the relief valve such that the relief valve will vent the emergency pressure even during testing of the relief valve.

The apparatus of this invention is an in-service testing apparatus for testing a relief valve while allowing the relief valve to remain operational. The apparatus of this invention includes a system isolation valve adapted to be mounted onto a vessel or pipeline containing system fluid. The system isolator valve is further adapted to have mounted therewith a pressure relief valve. The system isolation valve includes an isolator means for allowing the system fluid pressure to be transmitted to the relief valve under normal operating conditions. The isolator means further includes means for isolating the relief valve from the system fluid in response to the introduction of test fluid into the system isolator valve. The isolator means further includes means for allowing the transmission of system fluid through the isolator valve to the relief valve in response to system fluid pressure attaining an emergency level whereby the relief valve is operable even during testing.

This summary of the invention is not intended to be fully inclusive of all the patentable features of the invention, which will be set out in the claims to follow.

BRIEF DESCRIPTION OF THE DRAWINGS

FIG. 1 is a side view, partly in schematic, of the system isolator valve of this invention illustrated in position on a vessel or pipeline, with the pressure responsive valve element being in a closed, testing position;

FIG. 2 is a sectional view taken upon line 2—2 of FIG. 1 illustrating the details of mounting of the valve element; and FIG. 3 is a side, sectional view partly in schematic similar to FIG. 1 with the pressure responsive element in an open position whereby fluid at emergency pressure levels from the pipeline or vessel are transmittable to the relief valve.

DESCRIPTION OF THE PREFERRED EMBODIMENT

Referring to the drawing, the in-service testing apparatus of the preferred embodiment of this invention is a system isolation valve generally designated as V which is adapted to be mounted on to a nozzle 10 mounted in an opening in a vessel or pipeline S. The system isolation valve V is further adapted to have mounted on the other end thereof a safety or pressure relief valve schematically illustrated and identified as R. Typically, such pressure relief valve R, which is sometimes referred to as a safety valve, is mounted directly onto a vessel or pipeline S through a nozzle 10. Such a relief valve R typically includes a ball valve element which is spring loaded and adjusted by adjusting spring compression to release in response to the attainment of an emergency pressure level of the fluid within the vessel or pipeline S. The problems associated with testing relief valve R have been previously discussed in the Background of the Invention. It should be understood that the vessel or pipeline S may be of virtually any variety and may include other types of equipment requiring relief valves which need to be tested from time to time. Because the application of such relief valves and the system isolation valve of this invention may apply not only to vessels or pipeline but other equipment utilizing relief valves, the term "system" will be utilized to cover any type of such use.

Under normal conditions a vessel or pipeline may be defined herein as containing a fluid at an operating pressure. In the event of some type of calamity or equipment malfunction, the pressure within the system S may reach an emergency level. It is known to set such relief valve R to open at such emergency pressure level in order to vent the pressure within the vessel or pipeline to assist in neutralizing the emergency situation. And, when it is necessary to test the relief valve R, such as by removal from the system or the utilization of the intermediate block valve as previously described, it is known to apply test fluid pressure at such emergency level through a relief valve test unit schematically designated as U in FIG. 1. Typically, such a test unit U includes a gauge 11 and connectors to connect to the pressure relief valve or the block valve previously described in order to apply a test fluid to the relief valve to determine if the relief valve will vent at the proper pressure level. This invention, both the method to be hereinafter described and the apparatus V, is adapted to use such a standard test unit U.

The system isolation valve V includes a generally cylindrical body 11 having a bore 12 formed therein. The bore 12 may be defined as being formed in three sections, including a lower section formed by downwardly converging frusto-conical wall portion 14a; an intermediate bore section formed by cylindrical wall section 14b; and, an upwardly converging bore section formed by frusto-conical wall portion 14c. The bore 12 terminates at its upper end in an internally threaded portion 15a. The lower end of the body 11 is adapted to mate against a flange portion 10a of the nozzle 10 such that the system isolation valve V may be mounted directly onto the nozzle 10 at its lower end. Typically, bolts 16 extend through circumferential openings in the flange portion 10a of the nozzle 10 and into threaded bores such as 17 machined into the lower end of the body 11 of the valve V. The nozzle 10 further includes a main body portion 10b having an externally threaded portion 10c which is screwed into an opening in the vessel or pipeline S. The nozzle 10 includes a central bore 10d which aligns with the body bore 12 of the valve V. The upper internally threaded end 15a of the valve body 11 receives the pressure relief valve R such that the bore 10d in the nozzle 10 and the bore 12 in the valve body 11 are in alignment with and may be in fluid communication with the bore of the relief valve R. The arrow 18 represents the direction of flow and application of system pressure through the nozzle bore 10d.

A valve element 20 is mounted by a mount means generally designated as 21 for movement between a sealed position illustrated in FIG. 1 and an open position illustrated in FIG. 3. The valve element 20 includes a cylindrical stem portion 20a and a pressure responsive closing element 20b attached thereto. The pressure responsive closing element 20b includes an upper surface portion 20c which is circular and flat and a lower surface portion 20d formed of a truncated cone which converges at a bottom apex of the valve element. The upper face 20c of element 20 is exposed to pressure of a fluid in bore 12 and the lower face 20d is exposed to system pressure.

The mount means generally designated as 21 includes a cylindrical mounting element 22 (FIG. 2) which is supported in the center of the bore 12 by four radially extending vanes 23a, 23b, 23c and 23d which are welded or cast onto the cylindrical mounting element 22 and extend radially into welded engagement against the walls 14b and 14a of the bore 12. Each of the vanes 23a–d includes an L-shaped recess such as 24 illustrated in FIGS. 1 and 3 which cooperate to provide a central cylindrical recess in which the pressure responsive closing element 20b moves between the sealed position of FIG. 1 and the open position of FIG. 3.

The lower portion of the body 11 further includes an annular groove 26 machined within the interior of the body 11 below the converging frusto-conical bore wall portion 14a. A sealing ring 27 is mounted within the annular groove 26 and mates against a ring surface on the nozzle 10. The sealing ring 27 includes an annular body 27a of a fluorocarbon such as Viton manufactured by E. I. dupont de Nemours Company. The seal ring body further includes a reinforcement ring 27b manufactured of a steel. The reinforcement ring 27b is of sufficient size to hold the entire seal 27 within the groove 26 even under operating pressures. The outer diameter of the reinforcement ring 27b is equal to the outer diameter of the groove 26 thereby causing the reinforcement ring 27b to hold the body 27a within the groove 26. When the pressure responsive closing element 20b of the valve element 20 is in its down, sealed position as illustrated in FIG. 1, the seal 27 is in sealing engagement with the lower, frusto-conical surface 20d of the pressure responsive closing element 20b thus preventing the passage of fluid from within the bore 12 of the valve V into the pipeline or vessel S.

The apparatus V of this invention further includes a needle valve 30 of a known design which is mounted into a side opening 15c in the valve body 11. The needle valve further includes an inlet (not shown) which is adapted to be connected to the test unit U for directing test fluid into the bore 12 of isolator valve V.

The test unit U may apply various types of testing mediums into the valve V. Typical testing mediums of fluids include nitrogen, oil, air or other fluids compatible with system fluid. It should be understood that the term "fluid" as used herein and as it pertains to the various fluids within the vessel or pipeline S may either be gas or liquid and thus the fluid for the test unit U may also be gas or liquid.

Under normal operating conditions, the valve V allows the valve element 20 to move to an open position as illustrated in FIG. 3 in response to normal operating pressure as well as emergency pressure within the pipeline or vessel S. In this manner, should an emergency level be attained by the fluid within the vessel or pipeline S, such fluid flows around the open valve element 20 and is applied against the valve element in the pressure relief valve R, which releases and thus vents the system in a known manner.

When it is desirable to test the safety or relief valve R, a test unit U is attached to the needle valve 30 and the needle valve 30 is opened. The application of a testing fluid through the needle valve 30 into the bore 12 will cause the valve element 20 to move to the down, sealed position of FIG. 3 when the pressure of the test fluid applied into the bore 12 exceeds the pressure within the system S. In the sealed position, the valve element 20 acts to prevent the test fluid from flowing into the system S such that the system S is isolated from the test unit fluid. When the pressure of the testing fluid within the bore 12 is increased to the predesignated emergency level, the relief valve R should release and thus a successful test of the relief valve is accomplished. Of course, if the relief valve is defective and does not properly release, it will be noted and the valve will be removed and replaced or repaired. All of such testing procedure occurs with the valve element 20 in its down, sealed position so that the test fluid does not enter the system S. However, should during the testing routine, an emergency pressure level be attained within the vessel or pipeline S, the pressure of the system fluid acting against the lower face 20d of the valve element 20 will cause the valve element to open so that the system pressure at an emergency level moves against the pressure relief valve R and can cause the pressure relief valve to open thus allowing the system to vent properly even during the testing operation. The downwardly converging shape of the lower face 20d of the pressure responsive valve element 20b, as well as the radial vanes 23a-d parallel to the flow path, provides for a smooth, substantially non-turbulent flow of the system pressure fluid through the valve V and into and through the pressure relief valve R.

The foregoing disclosure and description of the invention are illustrative and explanatory thereof, and various changes in the size, shape and materials, as well as in the details of the illustrated construction may be made without departing from the spirit of the invention.

I claim:

1. An in-service testing apparatus for testing a relief valve while allowing said relief valve to remain operational, comprising:
    a system isolator valve adapted to be mounted onto a vessel or pipeline containing system fluid;
    said system isolator valve being further adapted to have mounted therewith a pressure relief valve;
    said system isolator valve including isolator means for allowing said system fluid pressure to be transmitted to said relief valve under normal operating conditions;
    said isolator means further including means for isolating said relief valve from said system fluid in response to the introduction of test fluid into said system isolation valve;
    said isolator means further including means for allowing the transmission of system pressure through said isolator valve to said relief valve in response to system pressure attaining an emergency level whereby said relief valve is operable even during testing thereof;
    said system isolator valve and said isolator means including a test fluid entry valve, said test fluid entry valve, including:
    a valve body having a main bore therethrough, said bore being in fluid communication with said vessel or pipeline and with said relief valve;
    a valve element, said valve element including a cylindrical stem portion and a pressure responsive closing element mounted with said cylindrical stem portion;
    mount means mounting said valve element for movement between a sealed position and an open position, wherein said valve element in said sealed position seals off said bore in said valve body from said vessel or pipeline to prevent the entry of test fluid into said vessel or pipeline and provide for the testing of said relief valve, said mount means including a cylindrical mounting element and a plurality of radially extending vanes mounted within said bore and supporting said cylindrical mounting element therein; and
    said valve element cylindrical stem portion being mounted for movement in said cylindrical mounting element.

2. The structure set forth in claim 1, including:
    said pressure responsive closing element including a first surface portion facing said valve body bore to move said closing element to a sealed position in response to the introduction of test pressure into said bore greater than normal operating system pressure such that said relief valve is isolated from the normal operating system pressure during testing.

3. The structure set forth in claim 2, including:
    said pressure responsive closing element including a second surface portion facing said vessel or pipeline and having sufficient area exposed to system pressure from said vessel or pipeline to cause said closing element to move from said sealed position to said open position in response to the system pressure attaining an emergency level during testing such that said relief valve is exposed to the emergency system pressure.

4. The structure set forth in claim 1, including:
    an annular sealing ring mounted within said valve body bore between said vessel or pipeline and said pressure responsive closing element for receiving said closing element to form a seal therewith.

* * * * *